United States Patent
Allen

(10) Patent No.: US 10,706,146 B2
(45) Date of Patent: *Jul. 7, 2020

(54) SCANNING KERNEL DATA STRUCTURE CHARACTERISTICS

(71) Applicant: Amazon Technologies, Inc., Seattle, WA (US)

(72) Inventor: Nicholas Alexander Allen, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/698,399

(22) Filed: Sep. 7, 2017

(65) Prior Publication Data
US 2017/0372065 A1   Dec. 28, 2017

Related U.S. Application Data

(63) Continuation of application No. 14/468,943, filed on Aug. 26, 2014, now Pat. No. 9,767,276.

(51) Int. Cl.
*G06F 21/55* (2013.01)
*G06F 12/14* (2006.01)

(52) U.S. Cl.
CPC ........ *G06F 21/554* (2013.01); *G06F 12/1458* (2013.01); *G06F 21/55* (2013.01); *G06F 2221/2149* (2013.01)

(58) Field of Classification Search
CPC .......... G06F 21/554; G06F 2212/1052; G06F 2221/2149; G06F 12/1458; G06F 21/55
USPC ........................................................ 711/163
See application file for complete search history.

(56) References Cited

U.S. PATENT DOCUMENTS

| | | | |
|---|---|---|---|
| 6,167,425 A | 12/2000 | Beckhoff | |
| 7,373,520 B1 | 5/2008 | Borthakur et al. | |
| 7,904,278 B2 | 3/2011 | Wilson et al. | |
| 8,327,059 B2 | 12/2012 | Chen et al. | |
| 8,566,944 B2 | 10/2013 | Peinado et al. | |
| 8,583,891 B1 * | 11/2013 | Spangler | G06F 9/4406 711/173 |
| 8,645,950 B2 | 2/2014 | Fries et al. | |
| 8,745,308 B2 | 6/2014 | Chen et al. | |
| 8,949,797 B2 | 2/2015 | Aaraj et al. | |

(Continued)

OTHER PUBLICATIONS

Carbone et al., "Mapping Kernel Objects to Enable Systematic Integrity Checking," Proceedings of the 16th ACM Conference on Computer and Communications Security, Nov. 9-13, 2009, 11 pages.

(Continued)

*Primary Examiner* — Hashem Farrokh
(74) *Attorney, Agent, or Firm* — Davis Wright Tremaine LLP

(57) ABSTRACT

A method and apparatus for detecting kernel data structure tampering are disclosed. In the method and apparatus, a memory region of a computer system is scanned for one or more characteristics of a kernel data structure of an operating system kernel. It is then determined, based at least in part on identifying whether the one or more characteristics are found in the memory region, whether the kernel data structure is stored in the memory region of the computer system for tampering with the kernel data structure.

20 Claims, 7 Drawing Sheets

(56) References Cited

U.S. PATENT DOCUMENTS

| | | | |
|---|---|---|---|
| 8,950,007 B1* | 2/2015 | Teal | G06F 21/554 |
| | | | 726/30 |
| 9,575,793 B1 | 2/2017 | Allen | |
| 2004/0117620 A1 | 6/2004 | Rothrock | |
| 2005/0005101 A1 | 1/2005 | Yenduri | |
| 2005/0091365 A1 | 4/2005 | Lowell et al. | |
| 2005/0223362 A1 | 10/2005 | Whitlock et al. | |
| 2006/0015732 A1 | 1/2006 | Liu | |
| 2006/0242406 A1 | 10/2006 | Barde et al. | |
| 2006/0294592 A1* | 12/2006 | Polyakov | G06F 21/566 |
| | | | 726/24 |
| 2008/0320594 A1 | 12/2008 | Jiang | |
| 2009/0006862 A1 | 1/2009 | Alkove et al. | |
| 2010/0223613 A1 | 9/2010 | Schneider | |
| 2010/0325628 A1 | 12/2010 | Haga et al. | |
| 2011/0047621 A1 | 2/2011 | Brando et al. | |
| 2011/0283358 A1* | 11/2011 | Cochin | G06F 21/554 |
| | | | 726/23 |
| 2011/0321166 A1 | 12/2011 | Capalik et al. | |
| 2012/0011501 A1* | 1/2012 | Filali-Adib | G06F 9/45558 |
| | | | 718/1 |
| 2012/0311341 A1 | 12/2012 | Paris et al. | |
| 2013/0047150 A1 | 2/2013 | Malasky et al. | |
| 2014/0068704 A1* | 3/2014 | Grewal | H04L 63/0428 |
| | | | 726/1 |
| 2014/0215461 A1 | 7/2014 | Laor et al. | |
| 2014/0298338 A1 | 10/2014 | Doi | |
| 2014/0372717 A1* | 12/2014 | Ciu | G06F 21/53 |
| | | | 711/162 |
| 2015/0199514 A1* | 7/2015 | Tosa | G06F 21/554 |
| | | | 726/17 |
| 2015/0220735 A1* | 8/2015 | Paithane | G06F 21/566 |
| | | | 726/23 |

OTHER PUBLICATIONS

Pendergrass et al., "LKIM: The Linux Kernel Integrity Measurer," The Johns Hopkins APL Technical Digest, 2013, 32(2):509-516.

Saur et al., Locating x86 paging structures in memory images, ScienceDirect, 2010, pp. 28-37.

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

* cited by examiner

SCANNING KERNEL DATA STRUCTURE CHARACTERISTICS

CROSS-REFERENCE TO RELATED APPLICATIONS

This application is a continuation of U.S. patent application Ser. No. 14/468,943, filed on Aug. 26, 2014, entitled "SCANNING KERNEL DATA STRUCTURE CHARACTERISTICS." This application also incorporates by reference for all purposes the full disclosure of co-pending U.S. patent application Ser. No. 14/469,390, filed on Aug. 26, 2014, entitled "IDENTIFYING KERNEL DATA STRUCTURES,"co-pending U.S. patent application Ser. No. 14/469,200, filed on Aug. 26, 2014, entitled "IDENTIFYING TAMPER-RESISTANT CHARACTERISTICS FOR KERNEL DATA STRUCTURES," and co-pending U.S. patent application Ser. No. 14/469,151, filed on Aug. 26, 2014, entitled "SIGNATURE-BASED DETECTION OF KERNEL DATA STRUCTURE MODIFICATION."

BACKGROUND

Computer systems are often subject to attacks that attempt to control the operation of the computer systems and cause them to operate in a manner dictated by an attacker. One area of interest for attackers is the operating system kernel. The operating system kernel has a direct and substantial influence over the operation of the computer system and associated operating system and operating system-based executable applications. Further, because, in a hierarchal sense, the kernel space is below that of operating system applications, attacks on the kernel may be difficult to detect or deter by applications that run on the computer system.

It is, therefore, often challenging to detect or deter attacks on a kernel of a computer system. It is also challenging to detect or deter attacks on a kernel of a computer system without interrupting legitimate operations of the computer system.

BRIEF DESCRIPTION OF THE DRAWINGS

Various embodiments in accordance with the present disclosure will be described with reference to the drawings, in which.

DETAILED DESCRIPTION

Figure 1:
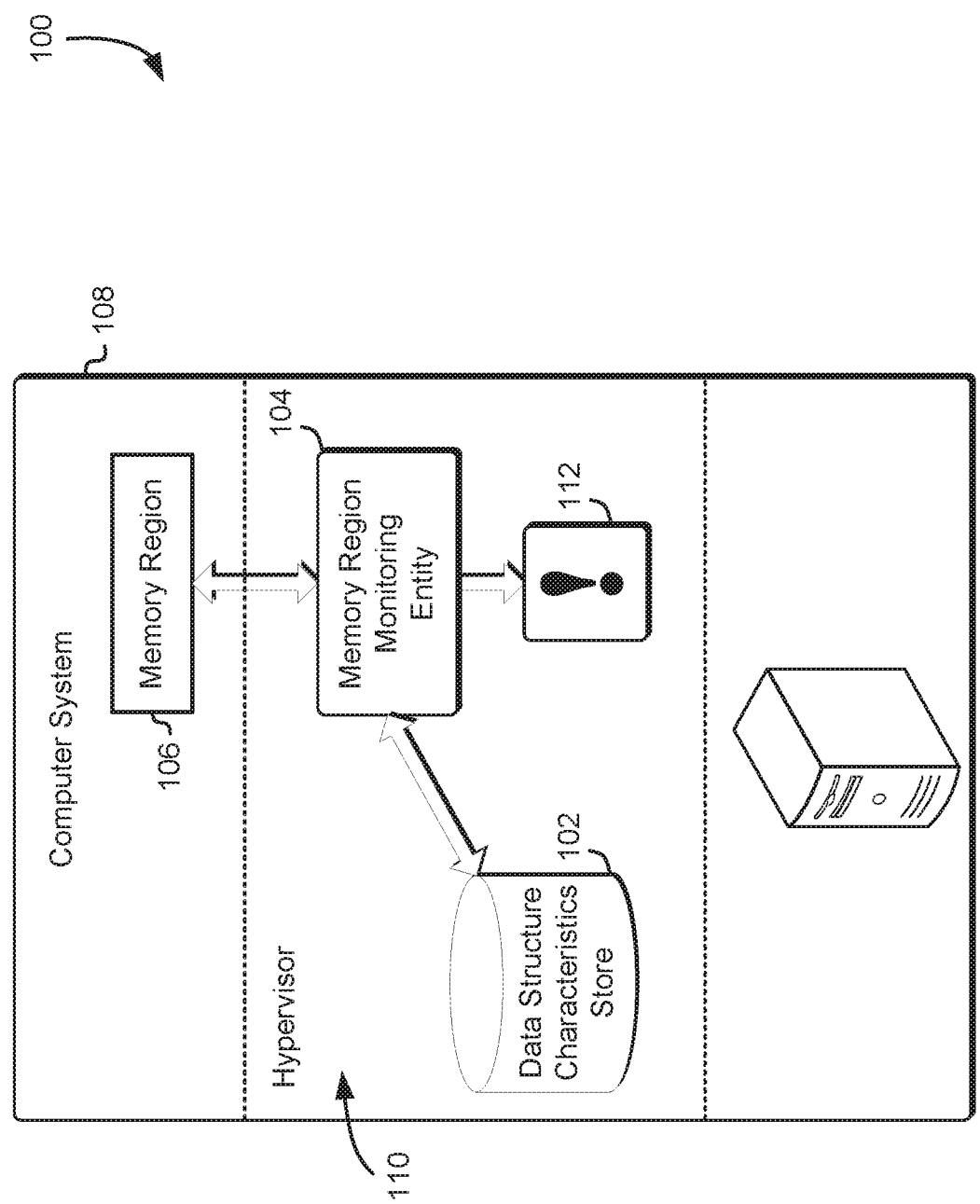
FIG. 1 shows an example of an environment for detecting kernel data structure tampering in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein enable the detection of kernel data structure tampering. A kernel data structure may be any type of data that is retained by a kernel of a computer system operating system. For example, the kernel data structure may include information about a running state of the computer system and may be modified to reflect a state of an operating system. If, for example, an application is launched or a user logs onto the computer system, a data structure may be created to represent the application launching or user login or link the data structure to other data structures. Further, the data structure may include pointers to memory addresses, memory addresses of other data structures or memory addresses of routines. The data structure may be stored in physical memory and may be intended to be accessible only by the kernel or associated subsystems.

In various embodiments, the computer system may be a virtual computer system that is instantiated using a virtualization entity (such as a hypervisor) using underlying computing resources provided by a host computer system. Due to the importance of kernel data structures to the operation of the computer system, kernel data structures may be a target for attack, whereby the kernel data structures may be modified so as to give an attacker control of the computer system or cause the computer system to operate in a manner controlled by the attacker. Furthermore, because kernel data structures are lower in a hierarchal sense than an operating system application-level, tampering with kernel data structures may not be detectable by operating system programs.

Characteristics of a kernel data structure may be obtained and may be used for identifying whether the kernel data structure or a modification thereof is stored in a memory page of the computer system. The characteristics of the kernel data structure may include a schema or a layout of the kernel data structure and may specify the relationship between various bits or fields of the kernel data structure. The characteristics of the kernel data structure specify attributes of tamper-resistant fields or non-tamper-resistant fields. A tamper-resistant field, as described herein, may be a field of the kernel data structure whose modification causes the computer system to malfunction. For example, modifying a tamper-resistant field of the kernel data structure may render the computer system inoperable or cause the computer system to "crash."

Conversely, modification of a non-tamper-resistant field of the kernel data structure may enable an attacker to cause the computer system to operate in a manner controlled by the attacker. Modification of the non-tamper-resistant field, while not, for example, causing the computer system to become inoperable, may enable an attacker to exploit the computer system in an unauthorized manner. The computer system may be exploited or attacked by copying a kernel data structure from the kernel space of the computer system to another memory location, such as a memory location in the user or application space of the computer system, and modifying the kernel code of the computer system or other code to use (or point to) the copied kernel data structure. The copied kernel data structure may be modified or changed to achieve a purpose of the attacker.

To detect or deter kernel data structure tampering, the memory pages of the computer system may be scanned for the characteristics of the kernel data structure. For example, the computer system may be suspended and a snapshot may be taken of a memory page of the computer system. A snapshot is a representation of the contents of the memory page, which may be a copy of some or all of the contents of the memory page. The snapshot of the memory page may be scanned to identify whether the characteristics of the kernel data structure are found in the memory page, whereby the characteristics of the kernel data structure may be tamper-resistant characteristics. When the snapshot of the memory page is found to include bits of data that meet the characteristics of the kernel data structure such may be taken as evidence of potential tampering with the scanned-for kernel data structure.

As a result of locating the characteristics in the memory page, the data that is found to meet the characteristics of the kernel data structure may be compared with the kernel data structure that is retained by the kernel space of the computer system. For example, differences between the two kernel data structures may be indicative of tampering with the kernel data structure. Additionally, if the kernel data structure found as a result of scanning is determined to be a copy of the kernel data structure, for example, due to the fact that the memory page used to store the kernel data structure is a user space or application space memory page and not a kernel space memory page, then it may be determined that the kernel data structure is stored in the memory page to facilitate an indirection attack. Further, the memory page may be placed under observation and it may be determined whether one or more kernel code instructions or other instructions (for example, upon being invoked) are configured to access the memory page or the memory addresses of the memory page storing the data that meets the kernel data structure characteristics.

A score may be maintained and updated as a result of determining that the kernel data structure is tampered with. The score may be used to determine whether one or more administrative actions may be taken with respect to the computer system. For example, if it is determined that the kernel data structure is tampered with, the computer system may be suspended or further detection of kernel data structure tampering may be performed to verify or reinforce the results of tampering detection. Reference is made herein to co-pending U.S. patent application Ser. No. 14/469,390, entitled "IDENTIFYING KERNEL DATA STRUCTURES", co-pending U.S. patent application Ser. No. 14/469,200, entitled "IDENTIFYING TAMPER-RESISTANT CHARACTERISTICS FOR KERNEL DATA STRUCTURES" and co-pending U.S. patent application Ser. No. 14/469,151, entitled "SIGNATURE-BASED DETECTION OF KERNEL DATA STRUCTURE MODIFICATION", which are incorporated by reference herein, for disclosure of other techniques for detecting kernel data structure tampering that may be used in conjunction with the embodiments described herein.

FIG. 1 shows an example of an environment for detecting kernel data structure tampering in accordance with at least one embodiment. In the environment 100, a computer system 108 having at least one memory region 106 and a virtualization layer enabled hypervisor 110 is shown. The hypervisor 110 has an associated data structure characteristics store 102 and memory region monitoring entity 104. The computer system 108 may be instantiated using resources of an underlying host computer system. The instantiation of the computer system 108 may be facilitated by the hypervisor 110.

The data structure characteristics store 102 stores one or more characteristics of a kernel data structure. The one or more characteristics of the kernel data structure may include a schema or a layout of the kernel data structure, among others. The memory region monitoring entity 104, which may be an application or a process implemented by the hypervisor 110, obtains the one or more characteristics from the data structure characteristics store 102. The memory region monitoring entity 104 uses the one or more characteristics to scan the memory region 106 of the computer system 108. The memory region monitoring entity 104 determines whether data stored in the memory region 106 satisfies the one or more characteristics of the kernel data structure. If the memory region monitoring entity 104 determines that data stored in the memory region 106 satisfies the one or more characteristics, the memory region monitoring entity 104 may provide an indication 112 of an observed match to the one or more characteristics. The indication 112 may be used to update a score usable for determining whether one or more actions may be taken with respect to the computer system 108. Further, the indication 112 may be used in determining whether further detection of tampering of the kernel data structure is to be performed. For example, it may be determined whether the addresses in the memory region 106 storing the data that meets the one or more characteristics of the kernel data structure are accessed by the kernel code of the computer system 108.

Figure 2:
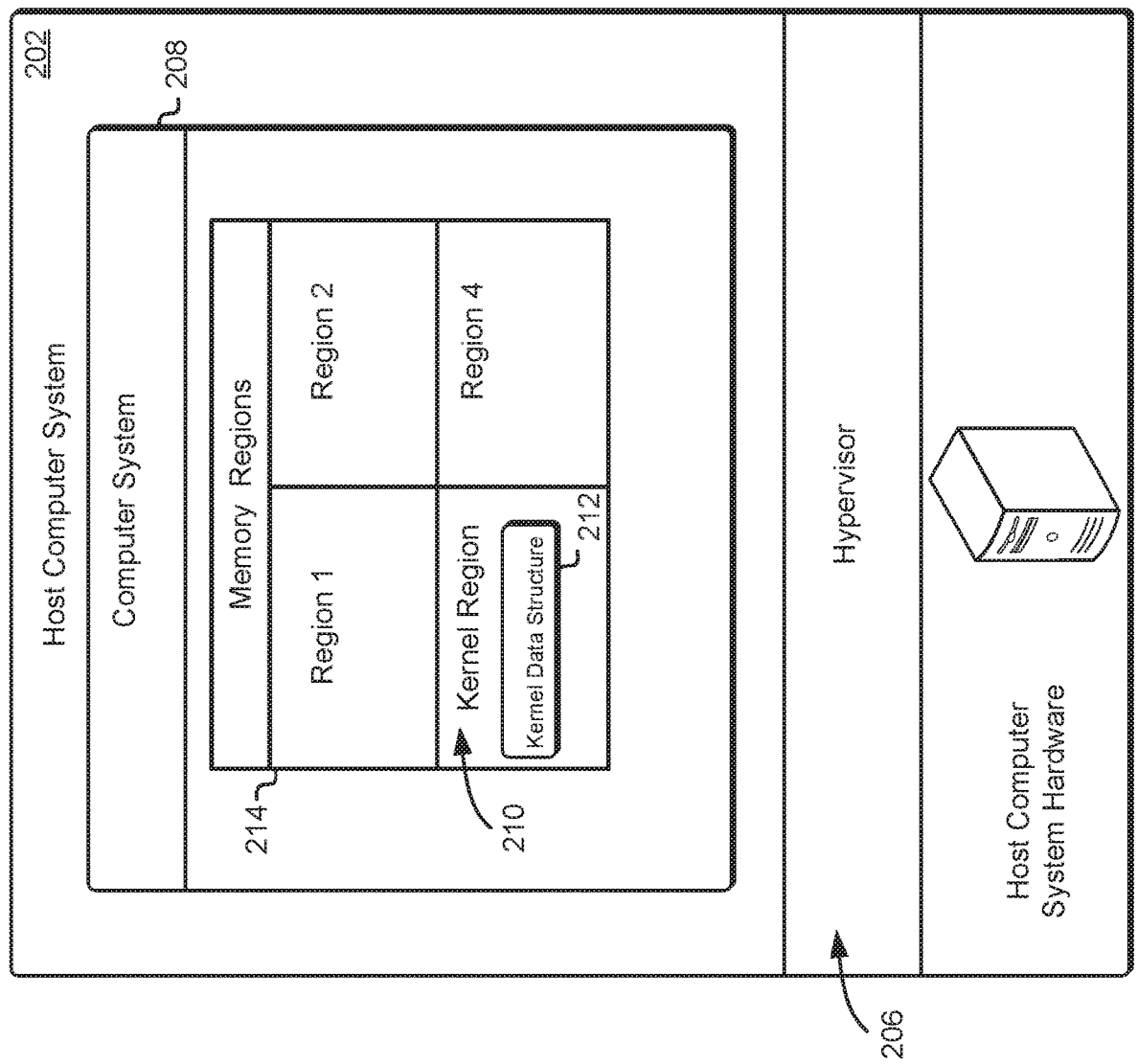
FIG. 2 shows an example of a host computer system having an instantiated computer system in accordance with at least one embodiment.

FIG. 2 shows an example of a host computer system having an instantiated computer system in accordance with at least one embodiment. The host computer system 202 may be a computer, server or host, among others and has underlying host computer system hardware. The host computer system 202 may be equipped with a processor, such as a central processing unit (CPU) or a graphics processing unit (GPU), that enables providing computational functionality. Examples of a CPU include those utilizing a complex instruction set computing (CISC) architecture, such as the x86 CPU, and others that utilize a reduced instruction set computing (RISC) architecture, such as the advanced RISC machine (ARM) CPU. The host computer system hardware may also include memory and storage devices. The memory may include volatile memory, such as random access memory (RAM), static random access memory (SRAM) or dynamic random access memory (DRAM). Further, the memory may include non-volatile memory, such as flash memory, read-only memory (ROM) or electrically erasable programmable read-only memory (EEPROM). The storage may be provided by a hard disk drive or an optical storage device, among others. The storage may be local to the host computer system 202 or may be remote and accessible by the host computer system 202 over a network.

The host computer system 202 may also be equipped with one or more network adapters. A network adapter may enable the host computer system 202 to communicate over a network with other computer systems or storage devices, among others. The network adapter may enable communication over any type of protocol including, but not limited to, a local area network (LAN) communication protocol, such as Ethernet, a wireless local area network (WLAN) communications protocol, such as an Institute for Electrical and Electronics Engineers (IEEE) 802.11, 802.16 or 802.21 communication protocol, short range communications protocol, or cellular wireless communications protocol, among others.

The host computer system 202 is equipped with a hypervisor 206 that is operable to manage the execution of a guest operating system on the computer system 208. The hypervisor 206 may instantiate the computer system 208 by presenting a guest operating system to the computer system 208. Further, the hypervisor 206 may cause the instantiated computer system 208 to be removed from operations or "torn down," for example, based at least in part on receiving a request. The computing resources allocated to the computer system 208 may then be reallocated to another computer system or reserved for future use. It is noted that although a hypervisor 206 is described with reference to FIG. 2, any virtualization layer entity may alternatively be used.

The computer system 208 has an associated kernel 210, whereby the kernel may be a computer program that manages input and output requests from an operating system or software executed on the computer system 208. Further, the kernel translates the requests into data processing instructions for processing by underlying computing resources. The requests (for example, system calls) may pertain to operations that are sought to be performed by a computer system program.

The kernel 210 has an associated kernel data structure 212. It is noted that although one kernel data structure 212 is shown in FIG. 2, it is understood that the kernel 210 may have an associated a plurality of data structures. A kernel data structure 212 may be any type of data that is retained by the kernel 210 of the computer system 208. For example, the kernel data structure 212 may include information about a running state of the computer system 208 and may be modified to reflect a state of an operating system. If, for example, an application is launched or a user logs onto the computer system 208, a data structure may be created to represent the new process or link the data structure to other data structures in the system. Further, the kernel data structure 212 may include pointers to memory addresses, memory addresses of other data structures or memory addresses of routines. The kernal data structure 212 may be stored in physical memory and may be intended to be accessible only by the kernel 210 or associated sub systems.

Attacks targeting the kernel data structure 212 may jeopardize the secure operation of the computer system 208. For example, the kernel data structure 212 may be modified to create a backdoor entryway to the computer system 208 or cause an installed firewall wall to cease operation in order to facilitate data exfiltration from the computer system 208, among others. The attacks may enable an attacker to take control of the computer system 208. Furthermore, attacks targeting the kernel data structure 212 may be undetected by applications running on the computer system 208. For example, if the computer system 208 has an application that is configured to detect attacks against the computer system 208, attacks against the kernel may be below the level at which the application is able to detect.

The kernel data structure 212 may have one or more associated data fields (not shown). A field may be one or more bits of the data of the kernel data structure 212, whereby for some kernel data structures 212, the field may be permitted to have varying values, whereas for other kernel data structures 212, the value associated with the field may not be permitted to change under ordinary operating conditions or unless certain conditions are met. An attack on the kernel data structure 212 may attempt to cause a value of a field to change, for example, to control or change the operation of the computer system 208. The kernel data structure 212 may have one or more characteristics that are usable to identify the kernel data structure 212. The one or more characteristics may, for example, be used to deduce a schema associated with the kernel data structure 212. The one or more characteristics may include a length of the kernel data structure 212 or values that the kernel data structure 212 or an associated field may take or assume. For example, the kernel data structure 212 may have a length (in bits or bytes) that is restricted to range or the data associated with a field of the kernel data structure 212 may be limited to a range of memory addresses. The characteristics of the kernel data structure 212 may be determined as described in co-pending U.S. patent application Ser. No. 14/469,390, filed concurrently herewith, entitled "IDENTIFYING KERNEL DATA STRUCTURES" and co-pending U.S. patent application Ser. No. 14/469,200, filed concurrently herewith, entitled "IDENTIFYING TAMPER-RESISTANT CHARACTERISTICS FOR KERNEL DATA STRUCTURES," which are incorporated by reference herein.

The kernel 210 may have an associated application code, whereby the application code may be executable instructions of the kernel 210 and may be retained in a protected area in memory. The application code may be used to execute processes or handling interrupts in kernel space as opposed to a user space. The application code of the kernel 210 may be used for memory management, process management, file management or input/output (I/O) management, among others. For example, the application code may ensure that processes (for example, running instances of a program) may obtain execution resources or processing power and that the processes do not overwrite one another's areas in memory. The application code may be used to execute a scheduler, a supervisor, an interrupt handler or a memory manager, among others.

The computer system 208 has associated memory regions 214 (singularly referred to herein as memory region 214). A memory region 214 may be a page in the memory of the computer system 208, whereby the page may be of any size. Examples of page sizes include 8, 16, 32 or 128 kilobytes (kB), among others. A memory region 214 may have an associated range of memory addresses (also referred to as virtual memory addresses), whereby a memory address may serve as a reference to a string of bits stored in the memory region 214. The kernel 210 or associated kernel data structure 212, which are part of the kernel space, may be stored in at least one memory region 214 of the plurality of memory regions as shown in FIG. 2.

Attacks that target the kernel 210 of the computer system 208 may seek to control or influence the operations of the computer system 208 by changing the kernel data structure 212. The kernel data structure 212 may be modified as stored in the kernel space. As an alternative to modifying the kernel space of the computer system 208, the kernel data structure 212 may be copied into a memory region 214 of the computer system 208, whereby the memory region 214 may not be part of the kernel space or allocated for use by the kernel. The computer system 208 may be configured to use the copy of the kernel data structure 212 instead of that stored in the kernel space. A pointer may be used to cause the kernel code of the computer system 208 to point to the copy of the kernel data structure 212 as opposed to that stored in the kernel space effectively limiting or eliminating the use of the kernel data structure 212 that is part of the kernel space. The copied kernel data structure 212 may, therefore, be made as the authoritative copy of the kernel data structure 212.

Figure 3:
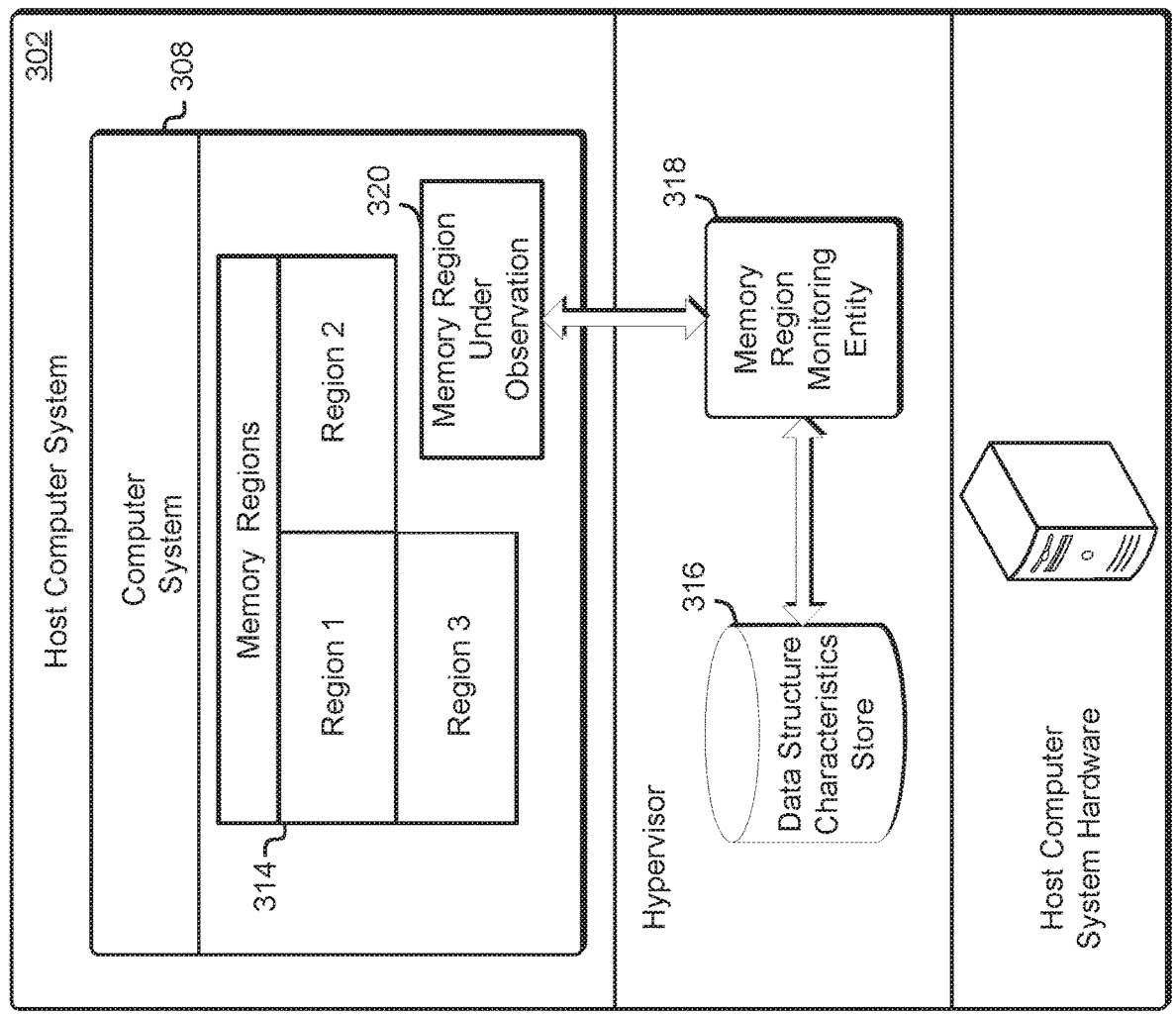
FIG. 3 shows an example of an environment for monitoring a memory region of a computer system in accordance with at least one embodiment.

FIG. 3 shows an example of an environment for monitoring a memory region of a computer system in accordance with at least one embodiment. The host computer system 302 shown in FIG. 3 is similar to the host computer system described with reference to numeral 202 in FIG. 2. A memory region 320 of the plurality of memory regions 314 is placed under observation, whereby the memory region under observation 320 may be evaluated to determine whether data structure characteristics (for example, that are stored in a data structure characteristics store 316) appear or are found to be evident in the memory region under observation 320. Each of the plurality of memory regions 314 may be placed under observation periodically for evaluation to determine whether their data meets kernel data structure characteristics. The memory region under observation 320 may be used to store any type of data such as user space data, operating system data or kernel space data. Evaluating the memory region under observation 320 may include evaluating the data of the memory region under observation 320 to determine whether characteristics known to be associated with a kernel data structure are found in the memory region under observation 320. The characteristics of the kernel data structure may be determined as described in co-pending U.S. patent application Ser. No. 14/469,390, entitled "IDENTIFYING KERNEL DATA STRUCTURES" and co-pending U.S. patent application Ser. No. 14/469,200, entitled "IDENTIFYING TAMPER-RESISTANT CHARACTERISTICS FOR KERNEL DATA STRUCTURES", which are incorporated by reference herein.

The characteristics of data structures of the kernel may be a layout or a schema of the data structure. For example, the characteristics may be patterns of bits or fields of the data structures, whereby values of certain fields or bits within the data structure may be associated with a bit position of the kernel data structure. Further, the characteristics may include relationships between fields of the kernel data structure, such as conditional relationships that associate the value of one field or bit position with the value of another field or bit position. The characteristics of the kernel data structure may pertain to tamper-resistant fields or non-tamper-resistant fields of the kernel data structure. Tamper-resistant fields may not be prone to change without adverse consequences on the operation of the computer system 308. Further, exploitation of the tamper-resistant fields may trigger noticeable changes in operation of the computer system 308 that would signify tampering. For example, modification of a tamper-resistant field may cause the computer system 308 to cease operation or "crash," whereas modification of a non-tamper-resistant field of the kernel data structure may make the computer system exploitable while the computer system continues to perform its operations as configured or the operations for which the computer system was launched to perform. Characteristics of non-tamper-resistant fields of the kernel data structure may be used to identify whether the data structure was copied into a memory region and potentially exploited. An attacker, for example, may configure the computer system 308 to use the kernel data structure copied to a memory region 314 instead of its counterpart kernel data structure stored in the kernel space of the computer system 308. The non-tamper-resistant fields of the kernel data structure may be modified to achieve the attacker's goals. However, due to their tamper-resistance nature, the tamper-resistant fields of the kernel data structure may not be subject to modification as modification of the tamper-resistant fields may cause the computer system 308 to malfunction. Furthermore, the tamper-resistant fields of the kernel data structure may be used to identify that the memory page stores the kernel data structure.

The data structure characteristics store 316 may be any type of memory in which characteristics of data structures are stored. A database service or a storage service may be used to store the characteristics and implemented the data structure characteristics store 316. A memory region monitoring entity 318 may be any type of application, process or program that evaluates the memory region under observation 320 to determine whether data stored in the memory region under observation 320 meets the kernel data structure characteristics that are stored by the data structure characteristics store 316. A score may be used to determine whether data of the memory region under observation 320 meet the kernel data structure characteristics. For example, the score may be proportional to the number of characteristics that were found to be met or satisfied by the data of the memory region under observation 320. If the score is found to exceed a threshold, it may be concluded that one or more actions may be taken with respect to the memory region under observation 320.

The one or more actions may include classifying the memory region under observation 320 as a candidate for continued monitoring or observation. Further, the kernel code may be evaluated to determine whether the memory region under observation 320 is referenced by the kernel code or is being accessed by the operating system. For example, pointers to the memory region under observation 320 or the data that meets the kernel data structure characteristics may be found. The pointers may be evidence that the data is used in an indirection attack. Additionally, a trap may be placed on the memory region under observation 320 such that when the kernel accesses the memory region under observation 320, the kernel code may be evaluated to determine the type of actions being performed by the kernel. Further, it may be determined whether an indirection was used to cause the kernel to use the data of the memory region under observation 320 as opposed to a corresponding kernel data structure in the kernel space.

As described herein, the characteristics of the kernel data structure may be used to determine whether a kernel data structure of the kernel space was copied to a memory region of the computer system 308. After the copying, executable instructions of the computer system 308 (such as kernel code or operating system code) may be modified (for example, by an attacker). Execution of the modified instructions redirects access (for example, read or write requests) to the copy of kernel data structure as opposed to the kernel data structure of the kernel space. Greater flexibility may be afforded to an attacker in modifying the copied kernel data structure than the kernel data structure of the kernel space. For example, the attacker may be restricted in the type of modifications that may be made to the kernel data structure of the kernel space.

Figure 4:
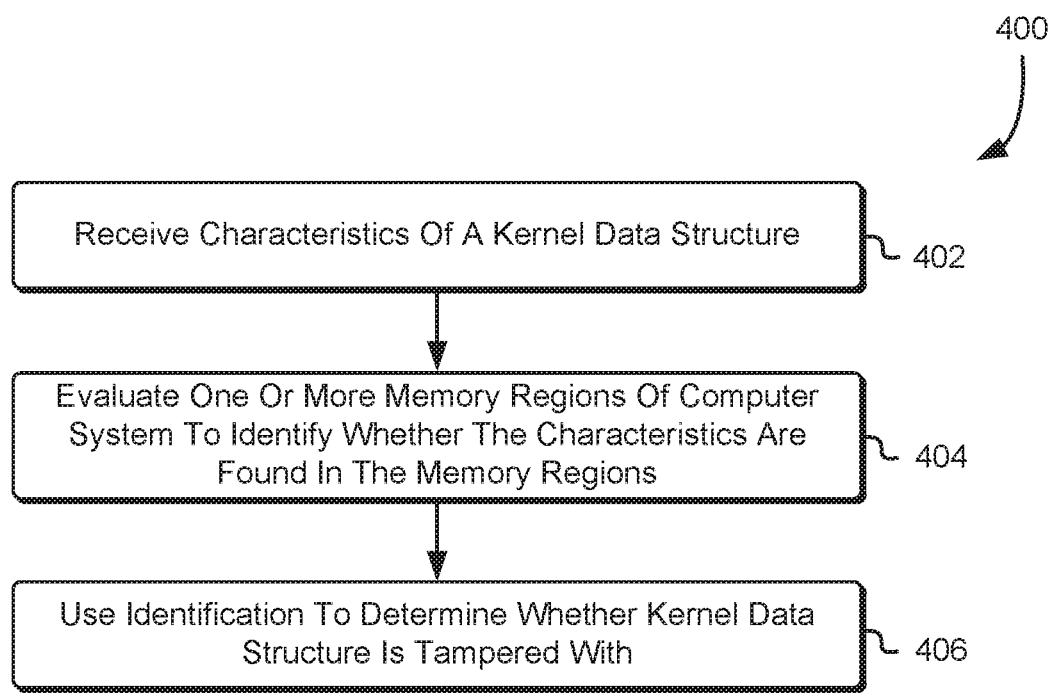
FIG. 4 shows an example of a method for identification of kernel data structure tampering in accordance with at least one embodiment.

FIG. 4 shows an example of a method for identification of kernel data structure tampering in accordance with at least one embodiment. In the process 400, an entity, such as the hypervisor described with reference to numeral 206 in FIG. 2, receives 402 characteristics of a kernel data structure. The characteristics may be stored in a data structure characteristics store, such the data structure characteristics store described with reference to numeral 316 in FIG. 3. The hypervisor may access the data structure characteristics store and may retrieve the characteristics of the kernel data structure for use in determining whether the kernel data structure was tampered with. Tampering with the kernel data structure may include copying the kernel data structure from the kernel space of a computer system to another memory region, modifying the kernel data structure in the memory region and tampering with kernel code such that the modified kernel data structure is accessed instead of the kernel data structure retained in the kernel space.

The hypervisor then evaluates 404 one or more memory regions of a computer system to identify whether the characteristics of the kernel data structure are found in the one or more memory regions. The hypervisor may parse or scan the one or more memory regions and identify whether the one or more memory regions are found to retain the characteristics of the kernel data structure. As described herein, the characteristics of the kernel data structure for which the hypervisor scans may be tamper-resistant characteristics as described in co-pending U.S. patent application Ser. No. 14/469,200, entitled "IDENTIFYING TAMPER-RESISTANT CHARACTERISTICS FOR KERNEL DATA STRUCTURES". Because the scanned-for characteristics are tamper-resistant, the kernel data structure may be identified despite being modified (for example, to accomplish an attacker's purpose). For example, non-tamper-resistant fields of the kernel data structure may be modified without disrupting the operation of the computer system, however, despite the modification the tamper-resistant field or characteristics of the kernel data structure may remain intact.

The hypervisor then uses 406 the identification to determine whether the kernel data structure is tampered with. In some instances, identifying that the characteristics of the kernel data structure are found in the one or more memory regions of the computer system may yield a false positive. For example, various bits stored in a memory region may satisfy the characteristics of the kernel data structure but the bits may not pertain to a kernel data structure or tamper-resistant fields thereof. When using the identification to determine whether the kernel data structure is tampered with, the hypervisor may place the memory region under observation and may monitor any requests to read the memory region or write to the memory region. Further, the hypervisor may monitor any requests to read or write to the particular memory addresses of the memory region that are found to meet the characteristics. The hypervisor may also evaluate the kernel code to determine whether instructions of the kernel code are configured to access the memory region or memory addresses of the memory region that are found to meet the characteristics. For example, if the kernel code is configured to access the memory region, it may be indicative of use of the memory region to store a tampered-with kernel data structure. A score may be updated based at least in part on the determinations, whereby if the score exceeds a threshold or is found to be in a particular range, one or more actions may be taken, such as suspending or terminating the computer system, among others.

Figure 5:
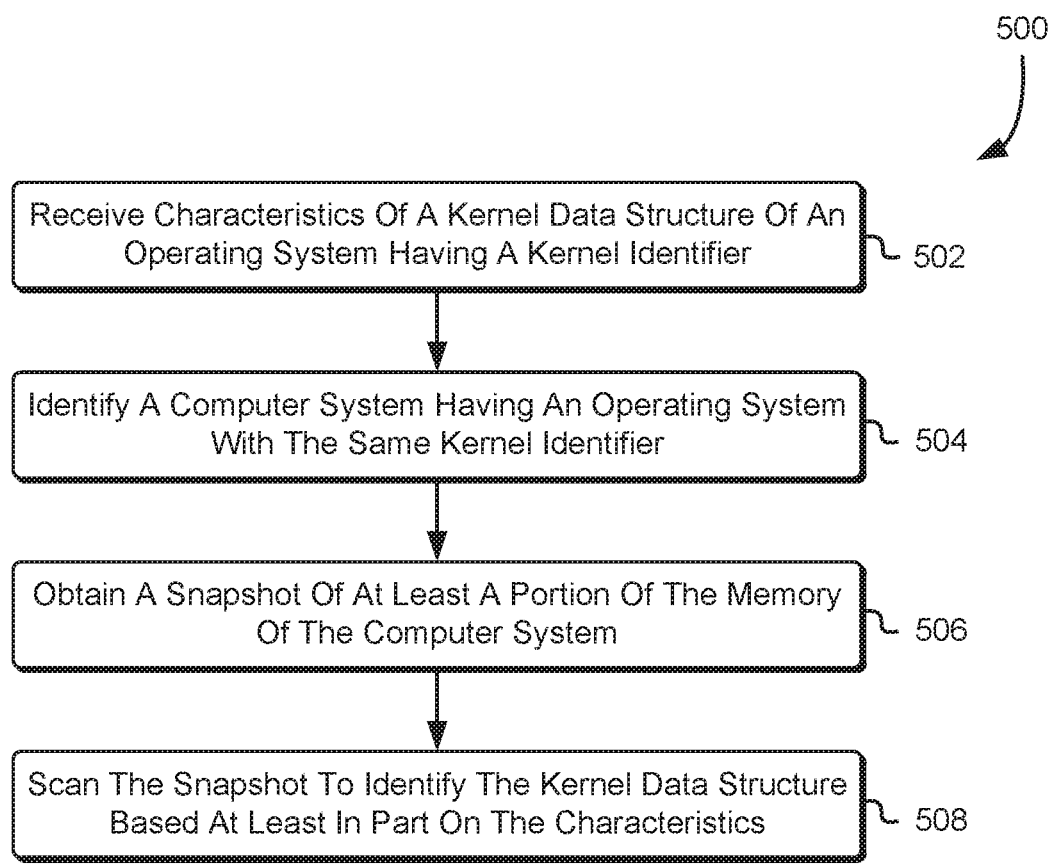
FIG. 5 shows an example of a method for identifying a kernel data structure in a computer system in accordance with at least on embodiment.

FIG. 5 shows an example of a method for identifying a kernel data structure in a computer system in accordance with at least on embodiment. In the process 500, a hypervisor, such as the hypervisor described with reference to numeral 206 in FIG. 2 receives 502 characteristics of a kernel data structure of an operating system, whereby the operating system has a kernel identifier. Execution of the computer system may be enabled using the hypervisor, whereby the hypervisor may, for example, enabling the computer system or the operating system running thereon to utilize the computing, storage or networking resources of an underlying host computer system. The operating system running on the computer system has a kernel which is associated with the kernel identifier. The kernel identifier may be used to distinguish various kernels of various operating systems. As may be recognized, various operating system kernels may have differing kernel data structures that are used to for executing the operating system. The received characteristics may pertain to one or more kernel data structures of an operating system kernel and these kernel data structures may be particular to the operating system kernel and may not be used in other operating system kernels.

The hypervisor then identifies 504 a computer system having an operating system with the same kernel identifier. The computer systems instantiated using the hypervisor may be associated with various operating system kernels. Accordingly, the hypervisor identifies a computer system having an operating system kernel to which the received characteristics are applicable. The hypervisor then obtains 506 a snapshot of at least a portion of the memory of the computer system. The snapshot may be a copy of one or more memory regions of the computer system. For example, the computer system may be suspended by the hypervisor to a disk image and the disk image may be copied to extract a copy of the memory of the computer system. The snapshot may be obtained when the computer system is in a consistent state. For example, the snapshot of the portion of the memory may be obtained at a point when it is determined that there are no outstanding read or write requests to the portion of the memory. Further, the hypervisor may copy one or more memory regions or memory pages of the computer system to a memory region pertaining to the hypervisor. Alternatively, one or more memory regions of the computer system may be marked or tagged as being copy-on-write. The hypervisor may read the one or more memory regions or a saved copy corresponding to the one or more memory regions. The hypervisor then scans 508 the snapshot of the one or more memory regions to identify the kernel data structure based at least in part on the characteristics. As described herein, the hypervisor may evaluate the data stored in the memory regions to determine whether characteristics of the kernel data structure are found in the data. If the characteristics are found, further evaluation may be performed with respect to the kernel data structure having the associated characteristics.

Figure 6:
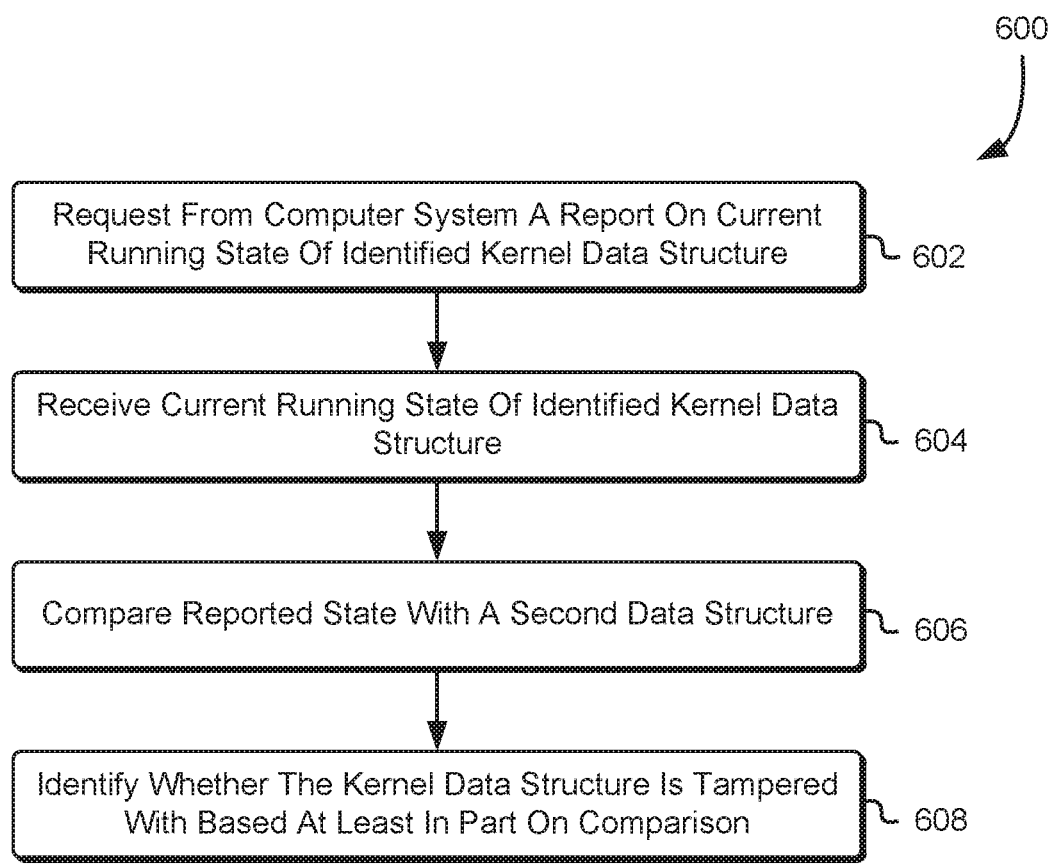
FIG. 6 shows an example of a method for identifying kernel data structure tampering in accordance with at least one embodiment.

FIG. 6 shows an example of a method for identifying kernel data structure tampering in accordance with at least one embodiment. In the process 600, a hypervisor requests 602 from a computer system a report on a current running state of an identified kernel data structure. The kernel data structure may have characteristics that were found in a memory region of the computer system as a result of scanning the memory region of the computer system for the characteristics. Finding the characteristics in the memory region may be indicative that a second data structure is stored in the memory region for use in a redirection attack or for tampering with the kernel data structure. Satisfaction of the request for the report on the current running state of the kernel data structure may require that the kernel data structure be provided to the hypervisor. Further, requesting the running state of the kernel data structure may include requesting information indicative of whether the kernel data structure has been modified or has changed (for example, as compared to a previous version). Upon modification of the kernel data structure, the hypervisor may receive information indicative of changes to the kernel data structure, whereby the information may be received over time.

In response to the request, the hypervisor receives 604 the current running state of the identified kernel data structure. The current running state of the kernel data structure may be a copy of the kernel data structure as retained in the kernel space of the computer system. When compared to the identified second data structure in the memory region of the computer system, modifications made to the kernel data structure may be ascertained. For example, the modifications may be made by an attacker and an indirection may be used to point to the second data structure as opposed to the kernel data structure of the kernel space of the computer system. It is noted that the kernel data structure of the kernel space and the second data structure need not be different to suspect fraudulent activity. For example, the kernel data structure may be copied as an initial step for staging an attack against the computer system.

The hypervisor then compares 606 the reported state with the second data structure. The comparing may include evaluating whether the data structures or associated fields are the same or different. The hypervisor also identifies 608 whether the kernel data structure is tampered with based at least in part on comparison. The kernel data structure may be determined to be tampered with if characteristics of the kernel data structure are found in the second data structure. For example, the kernel data structure may be determined to be tampered with if the kernel data structure and the second data structure are matching, whereby the data structures may be matching if they have fields in common of if the second data structure is determined to have some of the characteristics of the kernel data structure. It is noted that the data structures may not be identical to be deemed as matching. For example, the second data structure may differ from the kernel data structure due to tampering for the purposes of a redirection attack.

A measure, such as a confidence score, may be used to evaluate whether the kernel data structure is tampered with. The confidence score may be a function of the number of matching fields found in the kernel data structure and the second data structure. Further, the confidence score may be weighed. For example, tamper-resistant characteristics that are found in the second kernel structure may be weighed more heavily than non-tamper-resistant characteristics that are found in the second data structure, whereby the kernel data structure may be determined to be tampered with if the confidence score is within a specified range. Reference is made herein to co-pending U.S. patent application Ser. No. 14/469,390, entitled "IDENTIFYING KERNEL DATA STRUCTURES" and co-pending U.S. patent application Ser. No. 14/469,200, entitled "IDENTIFYING TAMPER-RESISTANT CHARACTERISTICS FOR KERNEL DATA STRUCTURES" for use of a confidence score as measure of similarity between data structures.

Figure 7:
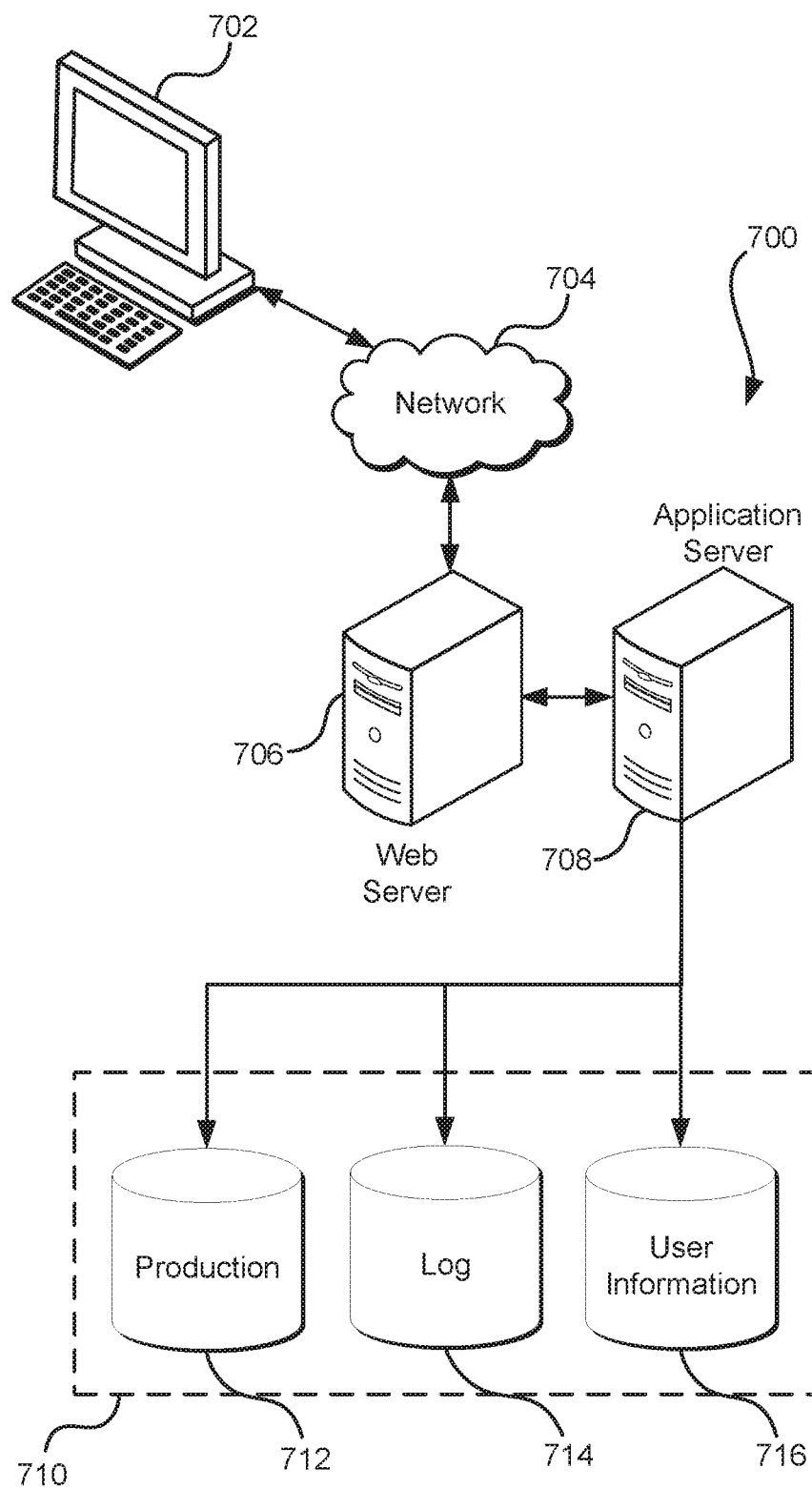
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer implemented method, comprising:
obtaining, from a data store that stores characteristics of data structures associated with an operating system kernel, a characteristic of data associated with a data structure of the operating system kernel, the characteristic of data indicating a value associated with a bit position of the data structure of the operating system kernel;
generating a snapshot of memory of a virtual machine;
scanning the snapshot to generate a determination that the characteristic of data is outside of a protected area of the memory; and
determining, based at least in part on the determination, that the operating system kernel is compromised.

2. The computer-implemented method of claim 1, wherein determining that the operating system kernel is compromised further comprises analyzing a range of the memory to determine the range includes the data structure comprising the characteristic.

3. The computer-implemented method of claim 1, wherein the data structure is designated by the operating system kernel as protected.

4. The computer-implemented method of claim 1, wherein determining that the operating system kernel is compromised further comprises comparing a current state associated with the operating system kernel with a state of data in the memory, where the data comprises the characteristic of data.

5. A system, comprising:
one or more processors; and
memory to store instructions that, as a result of being executed by the one or more processors, cause the system to:
obtain, from a data store, a characteristic associated with an operating system kernel, the characteristic indicating a value associated with a field of a data structure of the operating system kernel;
identify the characteristic in a memory region outside of a protected area by at least scanning a snapshot of the memory region for the characteristic; and
determine that the operating system kernel is compromised based at least in part on identifying the characteristic.

6. The system of claim 5, wherein the instructions that cause the system to determine that the operating system kernel is compromised further include instructions that further cause the system to determine an entity other than the operating system kernel is capable of accessing data including the characteristic in the memory region.

7. The system of claim 5, wherein the instructions that cause the system to determine the operating system kernel is compromised further include instructions that further cause the system to:
obtain a data structure from the protected area; and
compare the data structure with a different data structure in the memory region including the characteristic.

8. The system of claim 5, wherein the instructions that cause the system to determine the operating system kernel is compromised further include instructions that cause the system to determine a confidence score associated with a likelihood that the operating system kernel is compromised based at least in part on the characteristic.

9. The system of claim 8, wherein the likelihood is associated with a level of tamper-resistance attributable to the characteristic.

10. The system of claim 5, wherein the instructions that cause the system to identify the characteristic further include instructions that cause the system to suspend operation of a virtual computer system associated with the memory region prior to generating the snapshot.

11. The system of claim 5, wherein the characteristic is associated with a tamper-resistant attribute of the operating system kernel.

12. The system of claim 5, wherein the instructions that cause the system to determine the operating system kernel is compromised further include instructions that cause the system to determine that access to data in the memory region including the characteristic is redirected.

13. The system of claim 5, wherein the characteristic further indicates a conditional relationships between the value associated with the field of the data structure of the operating system kernel and a second value associated with a second field of the data structure of the operating system kernel.

14. The system of claim 5, wherein the value associated with the field of the data structure of the operating system kernel further comprises a tamper-resistant field, where modification of the value causes an operating system utilizing the operating system kernel to be prone to failure.

15. A non-transitory computer-readable storage medium storing thereon executable instructions that, as a result of being executed by one or more processors of a computer system, cause the computer system to:
retrieve a characteristic associated with an operating system kernel from a data store, the characteristic indicating a value associated with a field of a data structure associated with the operating system kernel;
detect, in a snapshot of a memory region of a virtual computer system, data with the characteristic in the memory region outside of a protected area; and
determine, as a result of detecting the characteristic in the memory region outside of the protected area, that the operating system kernel is compromised.

16. The non-transitory computer-readable storage medium of claim 15, wherein the instructions further include instructions that, as a result of being executed by the one or more processors, cause the computer system to:
generate the snapshot of the memory region; and
wherein the instructions that cause the computer system to detect the data with the characteristic further include instructions that, as a result of being executed by the one or more processors, cause the computer system to scan the snapshot for the characteristic.

17. The non-transitory computer-readable storage medium of claim 15, wherein the instructions that cause the computer system to determine the operating system is compromised further include instructions that, as a result of being executed by the one or more processors, cause the computer system to:
determine a current state of the data structure in the protected area, the data structure associated with the characteristic;
compare the current state with a state of data in the memory region, the state of the data including the characteristic; and
wherein the protected area and the memory region are included in a memory of the virtual computer system.

18. The non-transitory computer-readable storage medium of claim 15, wherein the instructions that cause the system to determine that the operating system kernel is compromised further include instructions that, as a result of being executed by the one or more processors, cause the system to determine a confidence score associated with a likelihood that the operating system kernel is compromised based at least in part on the characteristic.

19. The non-transitory computer-readable storage medium of claim 18, wherein the likelihood is associated with a level of tamper-resistance attributable to the characteristic.

20. The non-transitory computer-readable storage medium of claim 15, wherein the field of the data structure associated with the operating system kernel further comprises a non-tamper-resistant field of the data structure and the value indicates a non-modified value associated with the non-tamper-resistant field.

* * * * *